May 7, 1929. G. A. DIEMER 1,712,031
BAKING OVEN
Original Filed July 3, 1924 6 Sheets-Sheet 2
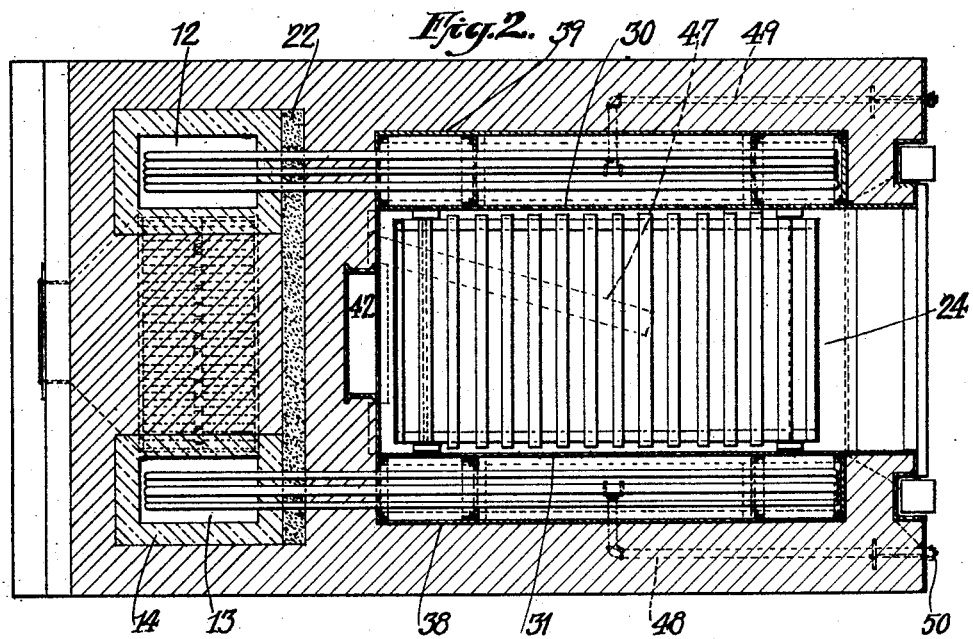
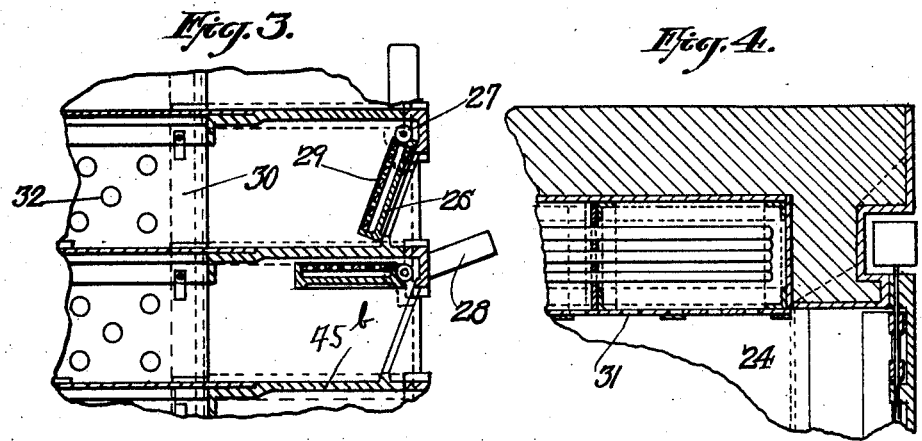
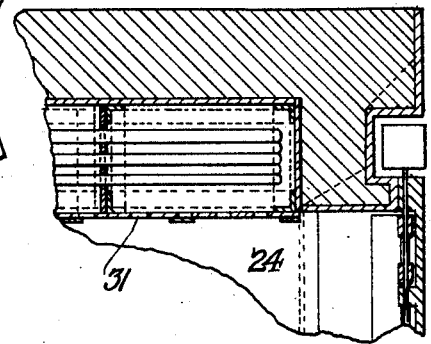
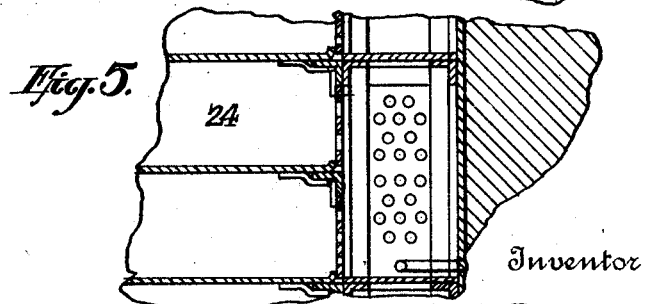
Inventor
G. A. Diemer
By Richard B. Owen
Attorney

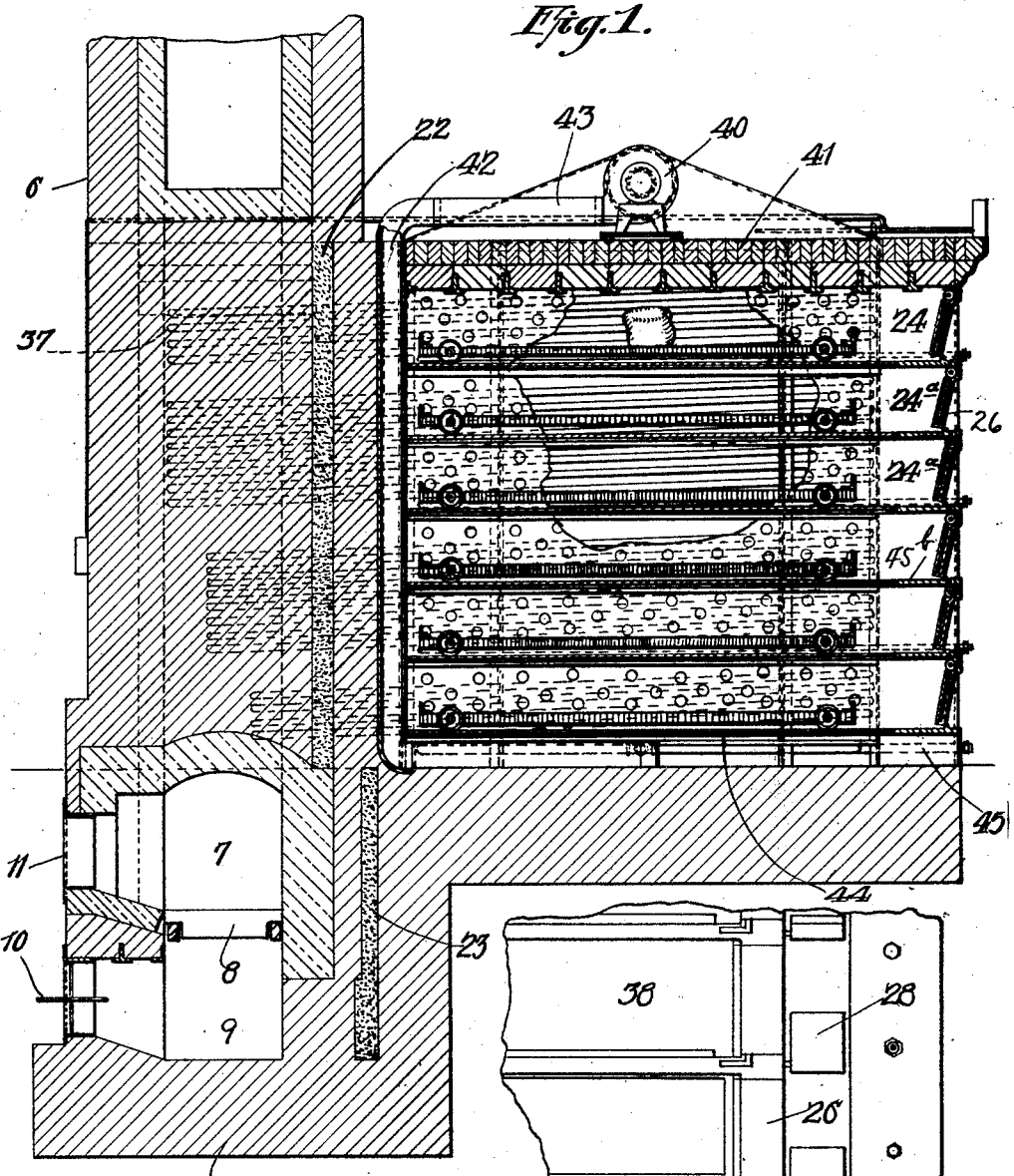

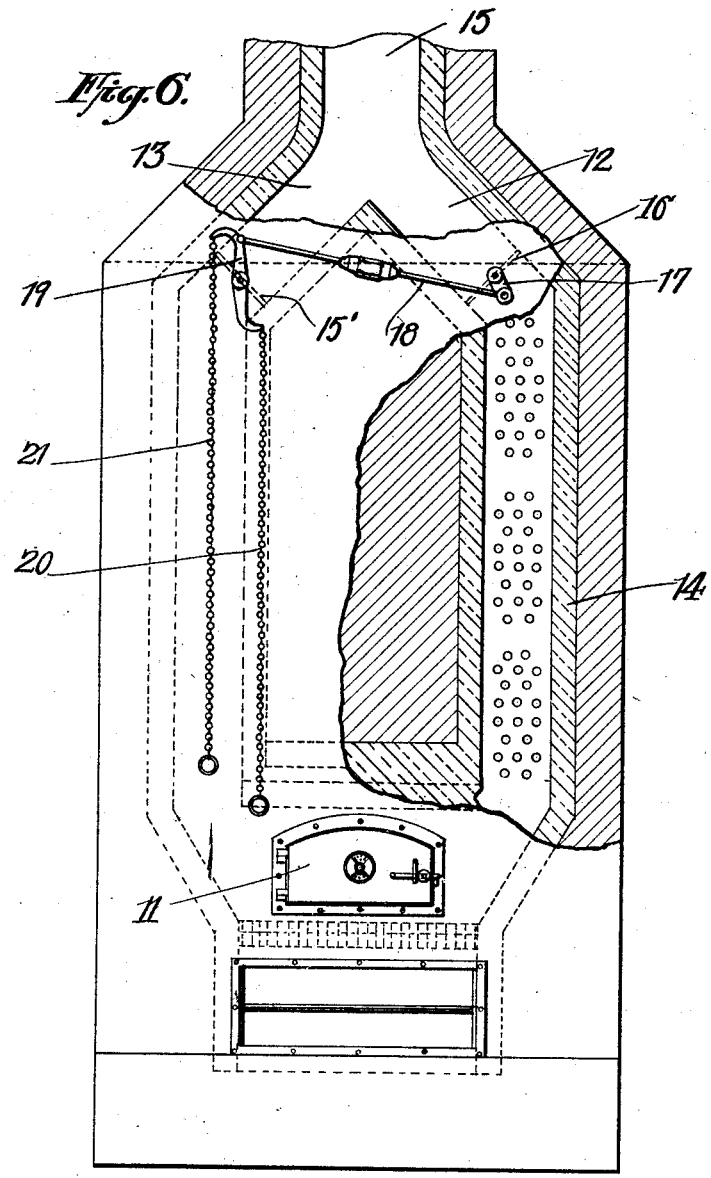

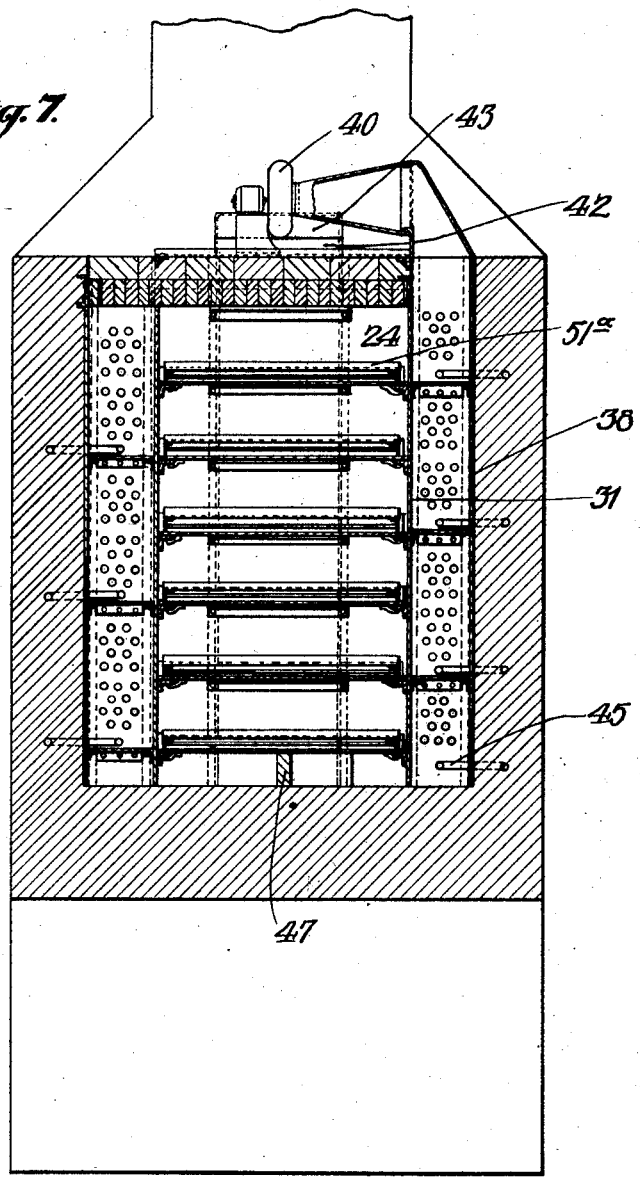

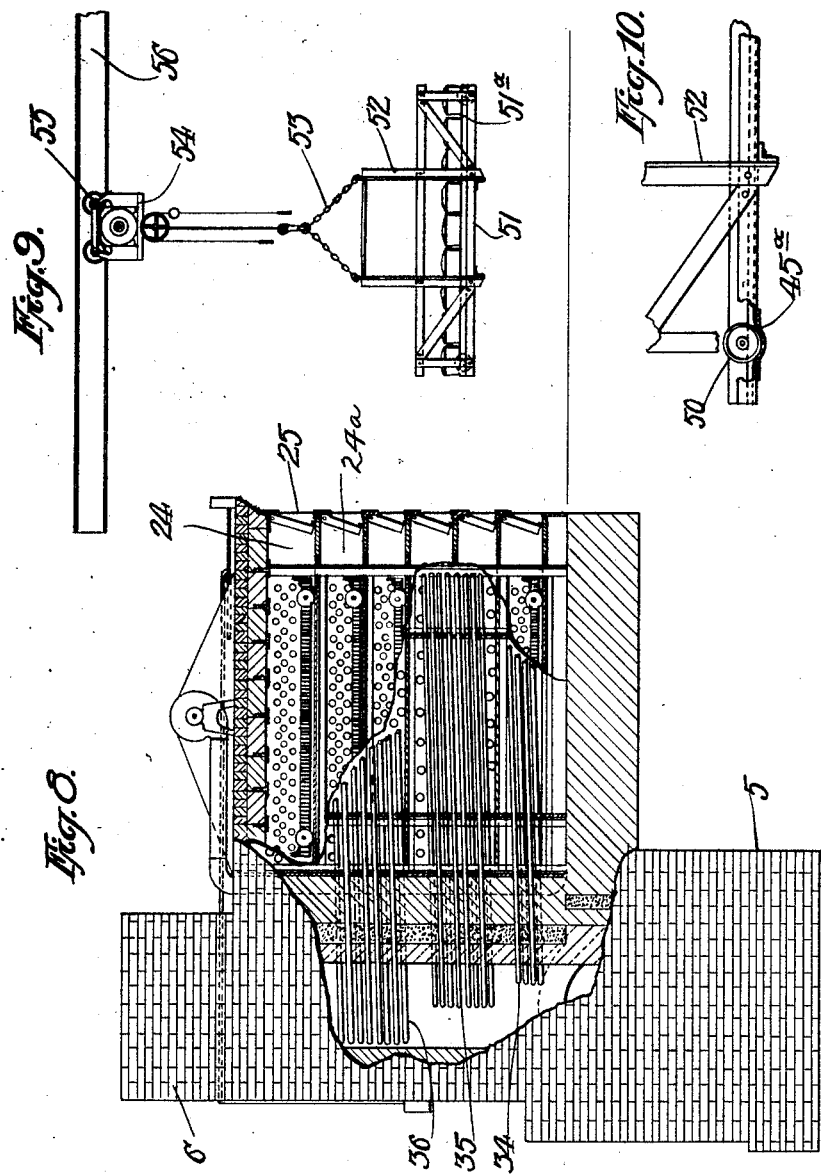

May 7, 1929.                G. A. DIEMER                1,712,031
                             BAKING OVEN
              Original Filed July 3, 1924    6 Sheets-Sheet 6
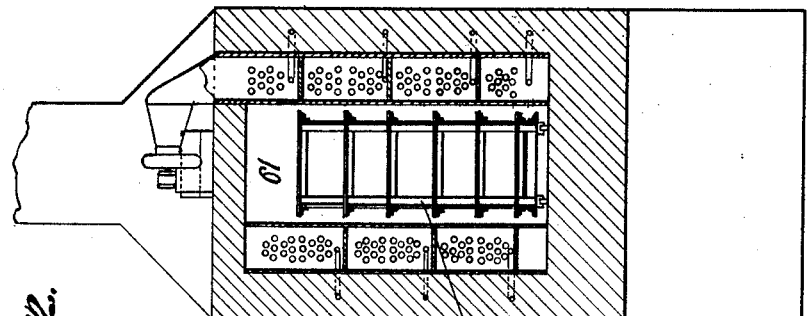
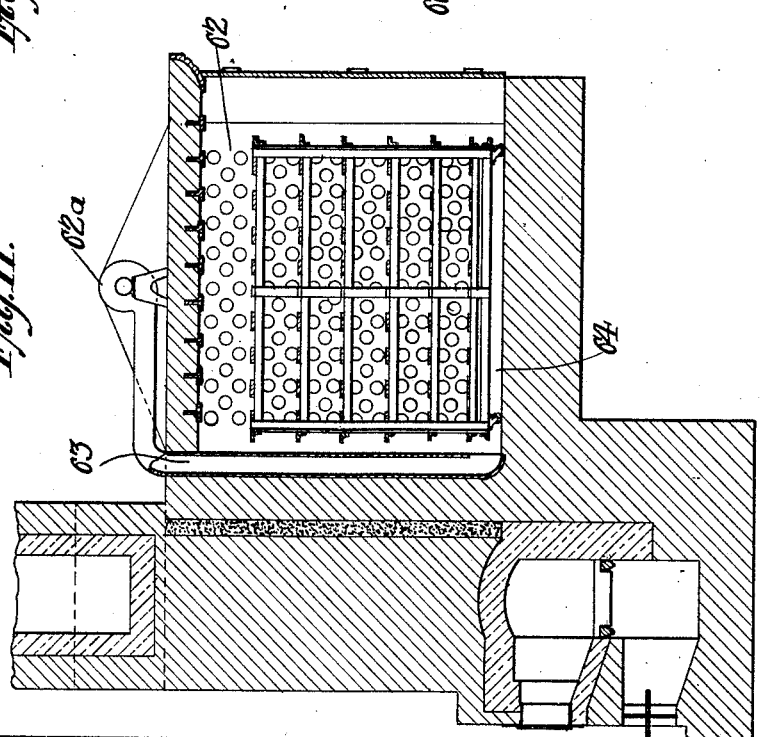
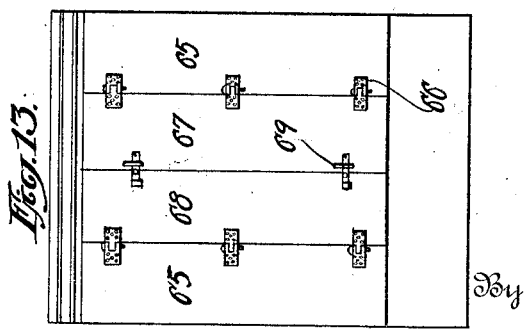
Inventor
G. A. Diemer.
By
Attorney
Richard B. Owen Patented May 7, 1929.

1,712,031

UNITED STATES PATENT OFFICE.

GEORGE ADAM DIEMER, OF NEWARK, NEW JERSEY.

BAKING OVEN.

Application filed July 3, 1924, Serial No. 724,094. Renewed October 3, 1928.

This invention relates to improvements in baking ovens and more particularly to a novel and improved stationary structure wherein a combined oven and furnace is provided including means for maintaining a constant circulation of heat uniformly throughout the entire oven during the baking operation.

One of the objects of my invention is to provide a combined furnace and baking oven including a series of water conduits so arranged with respect to the same that the heat generated will be uniformly distributed in said oven and to the various compartments including means for maintaining a constant circulation of the pre-heated air preliminary to loading the oven.

Another and further important object of my invention is the construction of a baking oven of the character above specified wherein a plurality of superimposed independent compartments are provided and a constant current of moist air may be maintained at the baking temperature.

An additional object of my invention is the construction of a baking oven such as is used in large bread and pastry making establishments wherein a plurality of superimposed compartments are provided including mechanical means for introducing trays in the various compartments when loading the oven.

A modified form of my invention also consists of a baking oven of the large commercial type wherein a single compartment is utilized to receive a portable rack which carries the material to be baked.

I accomplish the above objects and others which will become more apparent as the description proceeds and when taken in connection with the accompanying drawings showing a preferred embodiment of my invention, and wherein:

Figure 1 is a view of the furnace and oven partly in section showing the arrangement of the heating pipes and the air circulating means.

Figure 1ª is a fragmentary side view of the front compartment doors.

Figure 2 is a top elevation through the furnace and one of the compartments or rack chambers of the oven.

Figure 3 is a detail sectional view showing the doors or closures for the compartment or chambers and the baffle plates.

Figure 4 is a detail sectional view showing the arrangement of the heating pipes for the oven.

Figure 5 is a sectional view of the heating chamber for the pipe and the superimposed bread or rack chambers.

Figure 6 is a view partly in section of the furnace showing the flue arrangement and the dampers.

Figure 7 is a vertical section through the oven showing the rack chamber and the heating chamber with their relation to the air distributing mechanism.

Figure 8 is a view partly in section showing the furnace and the rack chamber in their relation to the heating pipe.

Figure 9 is a side view of an overhead swinging bread rack.

Figure 10 is a detailed view showing a portion of the bread rack when positioned in the oven.

Figure 11 is a side view in cross section of a modified form of the invention showing the use of a floor rack truck.

Figure 12 is an end view taken in section of the modified form shown in Figure 11. and Figure 13 is a front view of the doors or closure for the modified form of the invention illustrated.

Referring now to the drawings, wherein like reference characters designate corresponding parts throughout the several views, 5 designates the base and 6 the superstructure of the furnace preferably constructed of brick and having a fire box 7, grate 8, and ash pit 9, the pit having the usual hinged or swinging closure 10 and the fire box 7, the conventional type of hinged door 11 as is well understood in furnaces of this character. The fire box is preferably built of refractory material and the flues 12, 13, leading from the fire box, are also lined with refractory material or fire brick as indicated at 14 and more clearly shown by Figure 6 of the drawing. The flues 12, 13 communicate with the central or main flue 15 of the center and are adapted to be opened and closed by the dampers 15', 16, through the medium of the link and rod connection 17, 18, and the swinging curved arm 19 to which the pull chains 20, 21 are connected whereby upon manipulation of the respective chains the dampers may be opened to the desired degree.

The rear wall of the furnace is provided with a vertical space to receive a layer of sand 22 to more effectively confine the heat and a second layer of sand as indicated at 23 is further provided rearwardly of the fire box and ash pit for the same purpose.

The oven proper is built up with the furnace in such manner as to receive the proper heat through a system of pipe bankings subsequently to be referred to. Reference being had particularly to Figures 1 and 8 it will be observed that I have provided a plurality of superimposed independent baking chambers 24, the front 25 of which are each provided with a double walled closure or door 26 hingedly connected as indicated at 27 for inward movement, a counter-weight 28, being provided to maintain the same normally closed when thrown past dead center, will permit the door to swing inwardly to the position shown by Figure 3. Spaced insulation 29 on the inner side of the closure 26 effectively maintains and prevents the radiation of heat to the exterior at the front of the oven. The side walls 30, 31, of each compartment are provided with apertures 32 through which the heat passes from the pipe bankings 34, 35, 36 and 37 respectively. The said bankings extend longitudinally of the sides of the respective compartments and are confined between the walls 38, 39, and the apertured walls 31, 30, it being noted that the rear ends of the respective bankings extend within the flues 12, 13, so as to be heated.

In actual practice, the bankings are hermetically sealed and the heat generated in the pipes will pass upwardly from the lower to the respective superimposed chambers and will circulate regularly through the entire oven. The bankings are slightly inclined toward the furnace end so that when the steam condenses, the water will flow toward the furnace flues and will be immediately converted into steam when the furnace is heated. Since the heat generated by the furnace is greater near the fire box, less pipe surface is required and consequently it will be seen that the pipe banking 34 extends only partially within the flues. The next adjacent chambers are heated by the pipe bankings 35 and extend somewhat further into the flues. The chamber 24$^a$ is heated by the pipe banking 36 which extends entirely within the flues and takes up the greatest amount of pipe space as shown. The top banking 37 supplies the heat to the top chamber 24 and in order to uniformly distribute the heat generated by the respective pipe bankings, I have provided a blower designated in its entirety by numeral 40 positioned on the roof 41 of the said oven as more clearly shown by Figure 1 of the drawings. The blower 40 is in communication with the vertically extending duct 42 through the connection 43 which duct extends to the bottom 44 and beneath the flooring 45 of the lowermost chamber. A baffle bar 47 positioned beneath the flooring 45 directs the hot air passing down through the duct 42 to the side walls of the respective compartments and since the blower is adapted to be in constant operation, it will be seen that the heat generated will be uniformly distributed throughout all of the compartments by reason of the apertured side walls thereof so as to give the same degree of heat in the respective compartments. Each compartment above referred to is also provided with a steam pipe 48, 49, having a control valve 50 at the front end of the furnace for the admission of the required amount of moist air to the chambers.

The flooring 45$^b$ of each of the compartments in the oven are provided with depressions 45$^a$ to receive the rollers 50, mounted in the ends of a tray 51. The super-structure 52 connected to the tray 51 is suspended by chains 53 from a lifting crane 54 operable on rollers 55 along the track 56 so that the tray 51$^a$ as an entirety, may be raised and lowered to the desired compartment in the oven for the introduction of the said tray with the material to be baked. In the same manner, the trays may be rolled out of the front end of the furnace to be received by the tray supporting frame and its super-structure 52 and subsequently transferred where desired.

In the form of the invention as shown by Figures 11, 12 and 13, the oven end of the construction is designed to receive a portable roller rack 60, on which the dough is positioned preliminary to introducing said rack to the baking chamber 61, which extends from the top to the bottom of the oven. The inner walls 62 of the chamber are also provided with apertures for the passage of the heat generated in the pipe bankings as described above, and a blower 62$^a$ and duct 63 leading to the bottom 64 of the chamber uniformly distributes the generated heat and thus provides the regular temperature so that the bread in the upper portion of the rack will be baked at the same time as the bread in the lower portion thereof where the greatest heat is ordinarily had. The front wall 65 has hingedly connected thereto as indicated at 66, the outwardly swinging closures or doors 67, 68 which doors are of a width equal to the width of the chamber 61. Any suitable form of locking means 69 is provided to keep the doors 67 and 68 closed so as to prevent the passage of air therethrough.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Patent is:—

1. In an oven, the combination with a furnace of a baking compartment, flues on each side of the compartment, heat conducting pipe bankings positioned in said flues and a blower in communication with said flues.

2. In an oven, the combination with a furnace of a baking compartment, heat conducting pipe bankings positioned on each side of the compartment and extending within the furnace, and a blower above the baking compartment for uniformly circulating heat, transversely across said compartment.

3. In an oven, the combination with a furnace of a baking compartment, heat conducting pipe bankings positioned on the sides and extending from the front to the rear of the compartment, a blower above the baking compartment and a flue at the rear of said compartment whereby the heat may be circulated transversely throughout the baking compartment by said blower.

4. In an oven, the combination with a furnace of a baking compartment, inwardly spaced walls forming flues having apertures therethrough parallel with the sides of said compartment, heat conducting pipe bankings in said flues extending from the front to the rear of the compartment, a blower positioned on the top wall of the compartment and a flue communicating with the blower for circulating the heat throughout the said baking compartment.

5. In an oven, the combination with a furnace of a plurality of independent, superimposed baking compartments, a closure for each compartment, pipe bankings positioned along the sides of said compartments and extending within the furnace and a blower for circulating the heat within the compartments.

6. In an oven, the combination with a furnace of a plurality of baking compartments, a front closure for each compartment, a plurality of sealed pipe bankings positioned along the sides of the compartments and extending within the furnace, a blower and a flue connecting the said blower with one of said compartments.

7. In an oven, the combination with a furnace of a plurality of baking compartments, inwardly spaced walls having apertures therethrough parallel with the sides of said compartments, heat conducting pipe bankings positioned between said walls permitting the circulation of heat through all of said compartments, said pipe bankings being slightly inclined from front to rear, a blower and a flue extending from the blower to the bottom compartment.

In testimony whereof I affix my signature.

GEORGE ADAM DIEMER. [L. S.]